United States Patent [19]

Hall et al.

[11] 4,096,772

[45] Jun. 27, 1978

[54] TIRE SLITTING APPARATUS

[76] Inventors: Walter Dennis Hall, 13729 NE. Klickitat, Portland, Oreg. 97230; Merrell Thomas Miller, 13707 NE. Marine Dr., Portland, Oreg. 97211; Douglas L. Roof, 3117 NE. 33rd Ave., Portland, Oreg. 97212

[21] Appl. No.: 617,060

[22] Filed: Sep. 26, 1975 (Under 37 CFR 1.47)

[51] Int. Cl.$^2$ .................................................. B23B 3/04

[52] U.S. Cl. ........................................... 82/82; 82/86; 82/91; 82/101; 157/13

[58] Field of Search .................... 82/82, 70.2, 101, 86, 82/91; 157/13

[56] References Cited

U.S. PATENT DOCUMENTS

| | | | |
|---|---|---|---|
| 1,603,859 | 10/1926 | Midgley | 82/82 |
| 1,971,582 | 8/1934 | Scruby | 157/13 |
| 2,254,526 | 9/1941 | Hawkinson | 157/13 |
| 3,701,296 | 10/1972 | Snow | 82/101 X |
| 3,830,120 | 8/1974 | Peterson | 157/13 X |
| 4,012,973 | 3/1977 | Tupper | 157/13 |

*Primary Examiner*—Leonidas Vlachos
*Attorney, Agent, or Firm*—Eugene D. Farley

[57] ABSTRACT

A tire slitting apparatus for slitting tire carcasses circumferentially into segments comprises a frame with a tire slitting head mounted thereon to fit inside the body of a tire, and tire drive means to rotate the tire around the tire slitting head. Cutting means are mounted on the tire slitting head to slit the tire and external guide means are positionable against the side walls of the tire to guide and stabilize it during the slitting.

6 Claims, 9 Drawing Figures

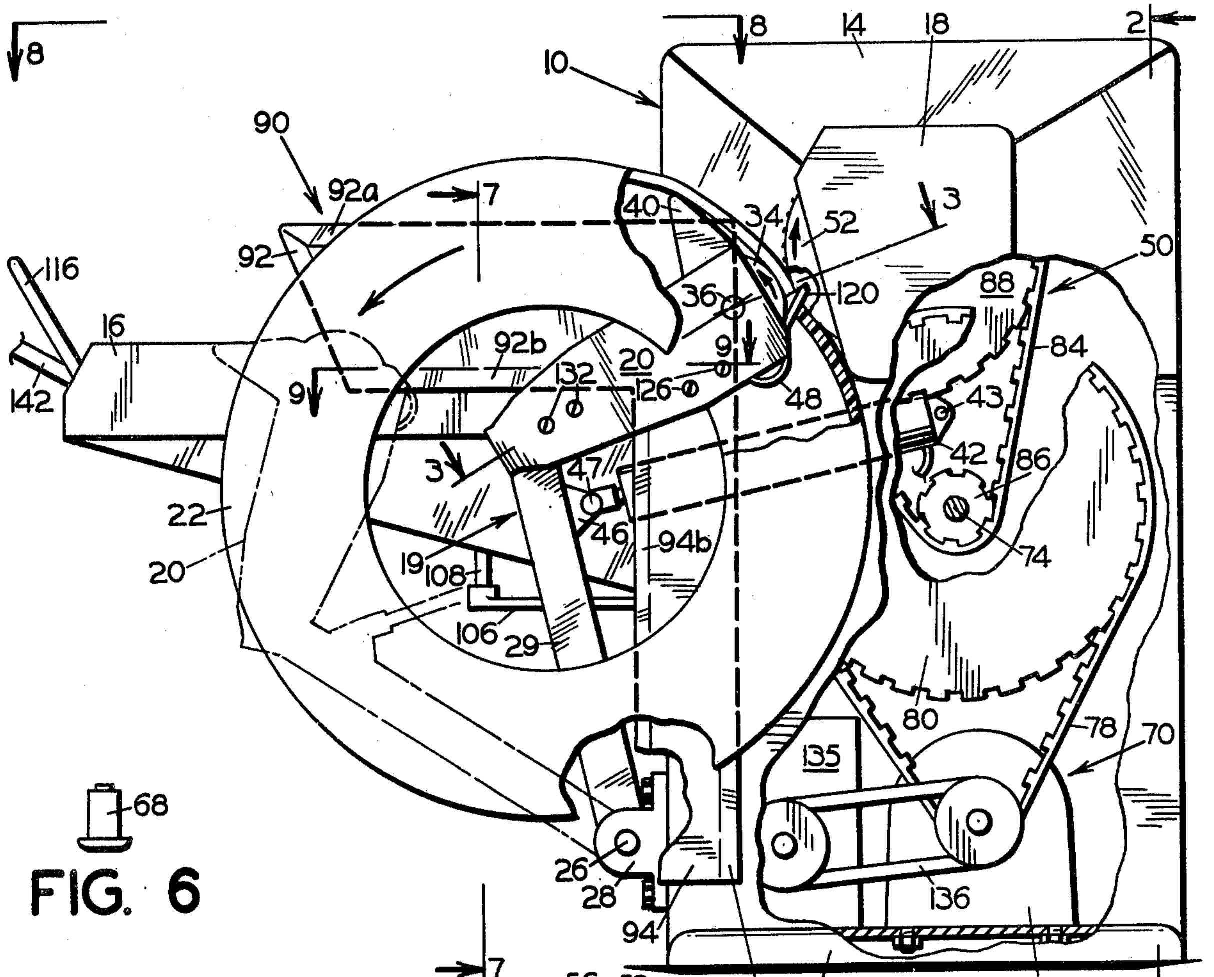
FIG. 1
FIG. 6
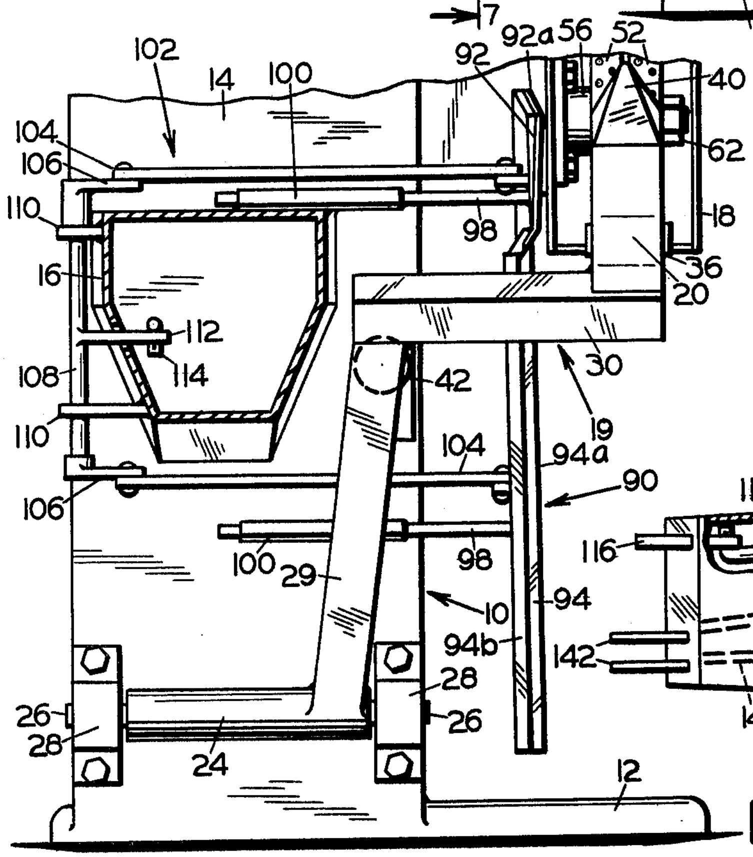
FIG. 7
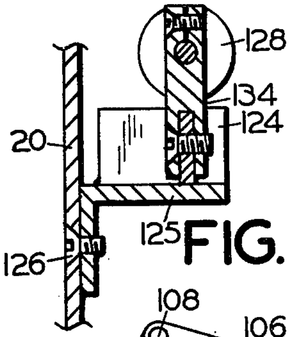
FIG. 5
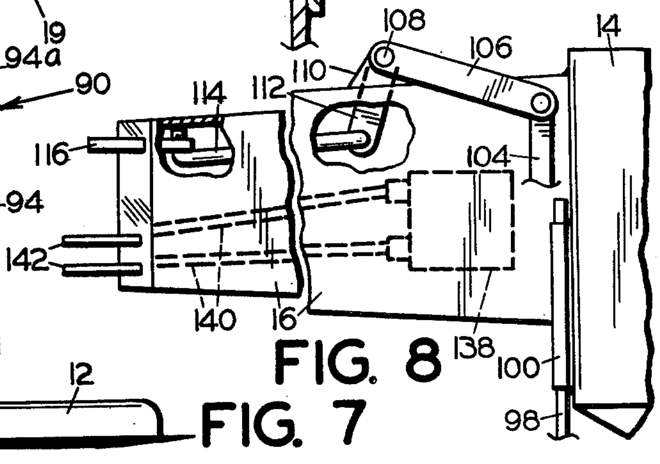
FIG. 8

TIRE SLITTING APPARATUS

BACKGROUND OF THE INVENTION

This invention relates to a tire slitting apparatus, and in particular to a power driven tire slitting apparatus for rapid slitting of a tire.

Bulky tire carcasses are heavy, hard to handle, and take up a considerable amount of storage area. In addition, when they are transported their bulk results in underutilization of the weight capacity of most trucks.

Due to these problems it is desirable to slit the tires into circumferential segments to reduce their size, allowing for more compact, nestable stacking when stored and fewer trips when transported. For this purpose tire slitting apparatus have been utilized.

The prior art slitting apparatus generally have utilized rotatably mounted cutting elements positioned outside the tire and working against its crown. As a result, the cutting elements do not easily penetrate the crown of the tire which tends to deflect inwardly. Also the cutting speed of the prior art apparatus has been slow, resulting in inefficient operation.

It accordingly is the general purpose of the present invention to provide a tire slitting apparatus which overcomes the above problems and provides fast, efficient means of slitting tires.

It is a further object of the present invention to provide a tire slitting apparatus which is adjustable to accommodate the full range of tire sizes for us on all classes of vehicles.

It is a further object of the present invention to provide a tire slitting apparatus which has guide means to stabilize the tire, giving a uniform circumferential cut which meets itself.

It is a further object of the present invention to provide a tire slitting apparatus having open access, allowing easy loading and unloading of the tire.

It is a further object of the present invention to provide a tire slitting apparatus which has positive, non-slip, tire drive means.

It is a further object of the present invention to provide a tire slitting apparatus which is of compact design adaptable for portable use.

It is a further object of the present invention to provide a tire slitting apparatus which is safe in operation.

It is a still further object of the present invention to provide a tire slitting apparatus which is of simple, rugged construction for long trouble free use.

THE DRAWINGS

The manner in which the foregoing and other objects of the invention are accomplished will be apparent from the accompanying specification and claims, considered together with the drawings wherein:

FIG. 1 is a fragmentary side elevation view of the herein described apparatus, partially broken away to show details of internal construction;

FIG. 5 is a fragmentary cross-sectional view taken on line 5—5 of FIG. 3;

FIG. 6 is a detailed view, in side elevation, of a tire stud used in the apparatus of the present invention;

FIG. 7 is a fragmentary cross-sectional view, with the tire section omitted for clarity, taken on line 7—7 of FIG. 1;

FIG. 8 is a fragmentary plan view, foreshortened and partially broken away, taken on line 8—8 of FIG. 1.

GENERAL STATEMENT OF THE INVENTION

The tire slitting appartaus of our invention broadly comprises a frame having a tire slitting head mounted thereon to fit inside the body of a tire. Tire drive means engaging the tire is attached to the frame to rotatably drive the tire around the tire slitting head. Cutting means mounted on the tire slitting head penetrates the crown of the tire from the inside to slit it into circumferential segments as it is rotated about the tire slitting head. External guide means is positionable against the side wall of the tire to stabilize it during operation insuring a straight, uniform circumferential cut which accurately meets itself.

DETAILED DESCRIPTION OF A PREFERRED EMBODIMENT

Figure 2:
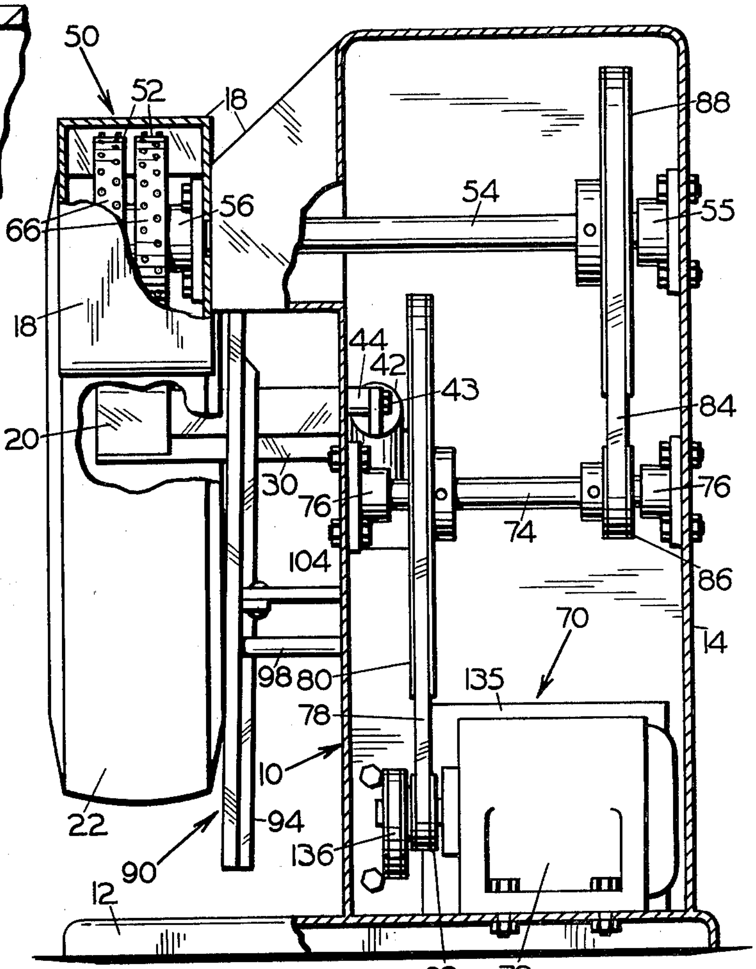
FIG. 2 is a cross-sectional view, partially broken away, taken on line 2—2 of FIG. 1.
Figure 9:
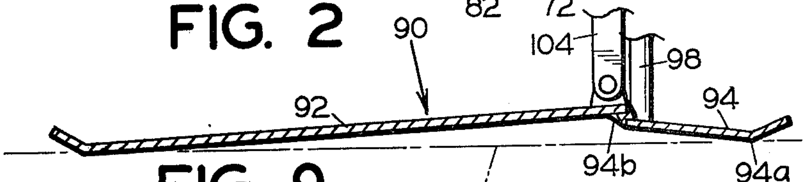
FIG. 9 is a fragmentary cross-sectional view taken on line 9—9 of FIG. 1.

Referring to FIGS. 1 and 2 of the drawings, the tire slitting apparatus of the present invention is mounted on frame 10. The frame locates and covers the operative elements of the apparatus and comprises base 12, cover 14, which is mounted above one end of the base, and control panel 16 which extends outwardly from joinder with the front of the cover. Drive hood 18 is located on one side of cover 14. Locating holes (not shown) may be positioned in the base to allow fixing the apparatus to an appropriate support.

Tire head assembly 19 is mounted pivotally to the frame and includes tire slitting head 20 which operatively engages tire 22. The tire slitting head is configured to enter the tire between the tire beads and to fit inside the body of tires used on all classes of vehicles.

The tire slitting head comprises a hollow box frame having trapezoidal sides and is open at the larger forward end. Spaced idler rollers 34, to engage the inner crown of the tire, are mounted for free, rotatable movement in the tire slitting head at its forward end. The idler rollers are located to position their forward portions forwardly of the tire slitting head, as shown in particular in FIG. 3. The idler rollers are mounted on idler shaft 36 which is mounted to the sides of the tire slitting head. The idler rollers are mounted on each end of the idler shaft leaving a gap therebetween.

Cutting means 118 is located on the tire slitting head 20 to slit the tire circumferentially when the tire is rotated on the idler rollers. The cutting means comprises a flat knife 120 having a pointed cutting portion with a sharpened edge and a rectangular alignment portion. The knife is located longitudinally in the tire slitting head in the gap between idler rollers 34.

Forward knife guide 122 and rearward knife guide 124 slideably support the alignment portion of the knife. The forward knife guide is attached to the forward portion of the tire slitting head. The rearward knife guide is attached to the medial portion of the tire slitting head by means of bracket 125 and screws 126.

Translation means, such as dual acting hydraulic cylinder 128, translates the knife in the knife guides between an extended cutting position in which the cutting portion of the knife extends past the idler rollers, and a retracted position in which the cutting portion is positioned behind the idler rollers. The hydraulic cylinder is attached pivotally at its cylinder end to the tire slitting head by means of bracket 130 and screws 132. The piston rod end of the hydraulic cylinder is joined rigidly to the extremity of the alignment portion of the knife by clamp 134.

The tire head assembly comprises a lower rod 24 having shafts 26 extending coaxially from each end. Bearings 28 journal the shafts on the lower portion of the front of cover 14 allowing the tire head assembly to be rotated between a loading position and a slitting position.

Referring to FIG. 7, tie arm 29 is joined at its lower end to one end of the lower rod. The tie arm interconnects the lower rod and upper bar 30. It is joined rigidly to the lower rod and the upper bar, preferably by welding.

Upper bar 30 cantilevers outwardly from joinder to the upper end of the tie arm parallel to the lower rod. Thus the upper bar is offset from the lower rod with its end portion located outwardly of the cover. The tire slitting head is rigidly attached to the outer end of the upper bar.

Internal guide means such as horn 40 extends outwardly from the top surface of the tire slitting head adjacent the idler rollers to guide the tire and aid in mounting it on the tire slitting head. The horn comprises a hollow pyramid with its apex pointed in a direction substantially normal to the top surface of the tire slitting head.

Activation means, such as double acting hydraulic cylinder 42, interengages the tire head assembly and the frame to reciprocate the tire head assembly between a loading position, shown by the phantom lines in FIG. 1, and a slitting position, shown by the solid lines in FIG. 1. Bolt 43 joins the hydraulic cylinder to boss 44, which is attached to the side of cover 14. Lug 46, which is attached to tie arm 29, is joined to the other end of the hydraulic cylinder by pin 47.

Figure 4:
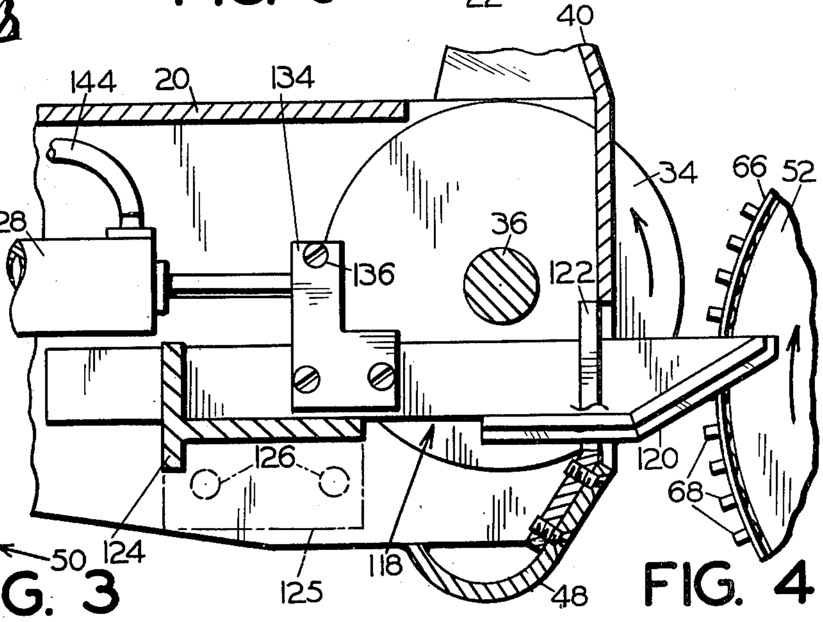
FIG. 4 is a fragmentary cross-sectional view, with the tire section omitted for clarity, taken on line 4—4 of FIG. 3.

Tire supports 48, FIG. 4, are attached to the forward end of the tire slitting head and face in a direction opposite the direction of the horn. The tire supports engage the side walls of the tire to prevent interference of the bottom of the tire slitting head with the tire when a tire having a small diameter is slit. The tire supports are shown in the preferred embodiment as comprising paired arcuate rods which are attached to the arm by means of screws.

Figure 3:
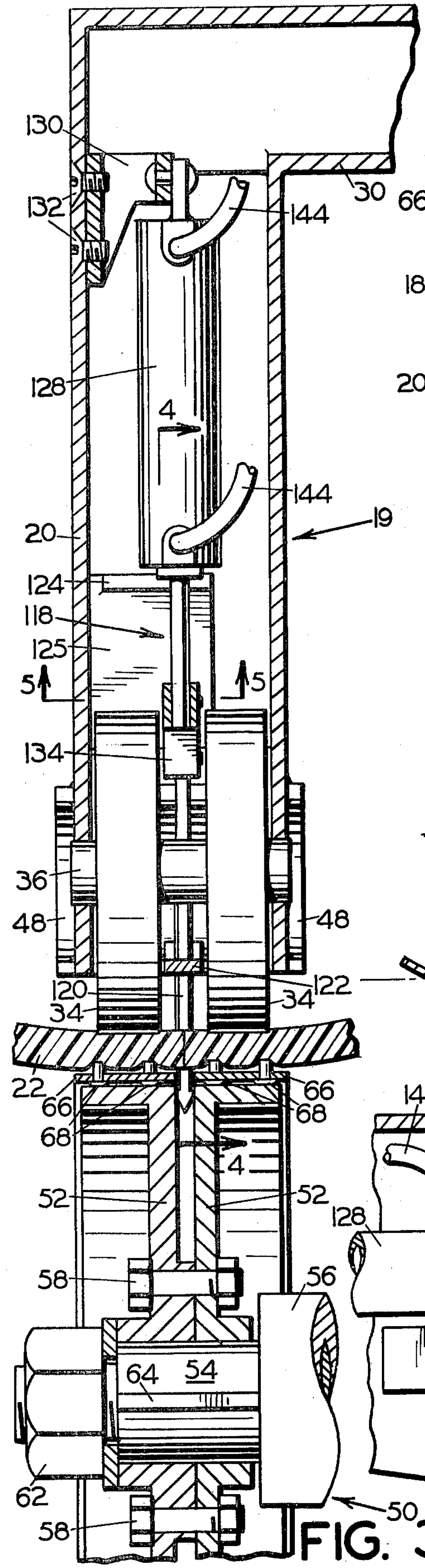
FIG. 3 is a fragmentary cross-sectional view, at an enlarged scale, taken on line 3—3 of FIG. 1.

Tire drive means 50, for rotating the tire around the tire slitting head is mounted within the drive hood 18. As shown in FIG. 1 and 3, the tire drive means includes drive rollers 52 located adjacent the idler rollers of the tire slitting head with which they cooperate. The drive rollers are mounted on drive shaft 54 to rotate therewith. The drive shaft is journaled in bearing 55, mounted on the cover, and in bearing 56, mounted on the drive hood. Preferably two drive rollers are used, spaced to align with idler rollers 34 of the tire head. The drive rollers are joined to one another by means of bolts 58.

The drive rollers are attached to the end of the drive shaft by means of nut 62 which engages a threaded end portion of the drive shaft. Key 64 fixes the drive rollers to the drive shaft so that they rotate therewith.

Metal bands 66 fit releasably over the drive rollers, as shown in FIGS. 3 and 4. The metal bands preferably are of a diameter to allow a press fit over the drive rollers so that they will engage the drive rollers frictionally to prevent relative rotational movement therebetween.

A plurality of holes are located in the metal bands in two circumferential rows. The holes are configured and dimensioned to receive tire studs 68, FIG. 6, such as are commonly inserted into snow tires to increase traction.

Referring to FIG. 4, the studs are pre-positioned in the metal bands before installation of the metal bands on the drive rollers in such a manner that the head portions are sandwiched between the metal bands and the drive rollers. Thus the gripping portions of the studs protrude outwardly from the drive rollers and the studs are maintained in operative position by the frictional engagement of the metal bands with the drive rollers.

Drive rollers 52 are driven by power means 70. The power means preferably comprises electric motor 72 which is mounted to frame 10 within cover 14. Sprocket shaft 74 is mounted rotatably in the central portion of the cover by means of bearings 76. First positive drive belt 78 interconnects a large diameter intermediate sprocket 80 mounted on one end of the sprocket shaft and a small diameter drive sprocket 82 driven by the motor.

Second positive drive belt 84 interconnects a small diameter intermediate sprocket 86 mounted on the other end of the sprocket shaft with large diameter sprocket 88 mounted on drive shaft 54. Thus the drive rollers are rotated at a speed considerably less than that of the motor.

External guide means 90 is positionable against the side of the tire to stabilize the tire during rotation and insure that the cut meets itself. The external guide means comprises an L-shaped plate having a horizontal leg 92 and a vertical leg 94. As shown in FIGS. 2 and 7, the external guide means is oriented to make three point contact with the side wall of the tire.

To this end the horizontal leg is angled longitudinally with respect to the plane of the tire so that its terminal portion is nearer the tire side wall than its center portion. The horizontal leg also is angled laterally with respect to the tire so that its upper edge **92*a* is nearer to the tire than its lower edge 92*b***.

The vertical leg 94 likewise is angled laterally with respect to the tire so that its outer edge **94*a* is nearer to the tire than its inner edge 94*b***. In addition, the vertical leg is offset toward the tire from the horizontal leg at the point of their joinder.

Sliding support means allows lateral movement of the guide means relative to the tire. The sliding support means comprises rods 98, which are attached to the external guide means, and cooperating guides 100, which are attached to cover 14. The sliding support means allows installation and removal of the tire and adjustment of the apparatus to accommodate tires of different widths. Preferably, two rods and guides are provided, with one set attached to the vertical leg and one attached to the horizontal leg.

Linkage means 102 enables the operator to initiate movement of the external guide means on the sliding support means. The linkage means comprises guide arms 104 which are attached at one end to the external guide means. The other ends of the guide arms are attached pivotally to one of the ends of cross arms 106. Preferably two guide arms are provided, one located adjacent each rod 98.

The other ends of the cross arms are interconnected by vertical rod 108 which is journaled rotatably in bearings 110. The bearings are attached to control panel 16. Lever 112 is joined medially to the vertical rod to rotate the rod and thus move the external guide means. Link 114 interconnects the lever and an operator's handle 116 located on the face of the control panel.

An hydraulic pump 135 is driven by motor 72 by means of belt 136. Lines 144 supply the hydraulic fluid through control valves (not shown) operated by control handles 142 and links 140 to actuate the hydraulic cylinders 42 and 128.

OPERATION

The manner of use of the herein described tire slitting apparatus is as follows:

In the first instance motor 72 is activated by an electric switch (not shown) to operate the drive rollers and the hydraulic pump.

With the tire head in its loading position, as shown by the phantom lines of FIG. 1, a tire is loaded on the apparatus. The tire is positioned with its bead and side walls over the tire slitting head and its inner crown surface adjacent idler rollers 34. Horn 40 spreads the bead of the tire to guide the side walls over the tire head during installation. It will be noted that the apparatus will accept any size automotive or truck tire for slitting.

External guide means 90 is positioned adjacent the side wall of the tire to stabilize it once rotation of the tire is commenced. Operator's handle 116, located on the control panel, is moved to manipulated linkage means 102 translating the external guide means on the sliding support means. It will be noted that due to the angular disposition of the legs of the external guide means three point contact is made with the tire side wall.

The tire slitting head then is moved to its slitting position, as shown by the solid lines of FIG. 1, bringing the outer crown of the tire to a position adjacent drive rollers 52. Thus the tire crown is frictionally engaged between the idler rollers and the drive rollers. The appropriate control handle 142 is manipulated to activate hydraulic cylinder 42 to position the tire head in the slitting position.

Thus the tire is rotated between the drive rollers and the idler rollers. Horn 40 lightly engages the inner crown of the tire to aid in guiding it during rotation. On a small diameter tire, tire supports 48 also engages the inner crown to aid in guiding the tire.

Once the tire has commenced rotation, the other control handle is manipulated to activate hydraulic cylinder 128 moving knife 120 in knife guides 122, 124 to its cutting position. As shown in FIG. 3, the knife extends to a position between drive rollers 52 and penetrates the crown of the tire from the inside. The knife then slits the tire as the tire rotates on the rollers.

After the tire has rotated for a complete revolution, it will be slit into two circumferential segments. The outer segment will be free to drop off of the tire slitting head and may be removed to a storage area.

Upon completion of the slitting both control handles are manipulated to move the knife to its retracted position and the tire slitting head to its loading position. Operator's handle 116 is manipulated to move the external guide means away from the tire side wall. The inner segment of the just slit tire may be removed from the tire head and a new tire may be loaded on the apparatus to repeat the operation.

It will be noted that since the knife is located inside the tire, it penetrates the crown easily and quickly rather than deflecting the casing as is the case with knives located outside of the tire.

Also, the three point contact of tire guide stabilizes the tire during rotation to give a straight circumferential cut which meets itself accurately.

In addition, the positive non-slip tire drive created by the studded drive rollers allows quick slitting of the casing. The tire essentially is driven at the same rotational speed as the drive rollers throughout the slitting.

Due to these features the apparatus of the present invention allows rapid slitting of a tire. The time taken to slit a typical tire is 5–8 seconds.

In addition the adjustability of the tire head and guide means allows slitting of a full range of tire sizes on a single machine in a safe manner.

Having thus described our invention in a preferred embodiment, we claim:

1. A tire slitting apparatus for slitting tire carcasses circumferentially into segments, comprising:
   a. a frame,
   b. a tire head assembly mounted on the frame and receiving the tire,
   c. a tire slitting head mounted on the tire head assembly and fitting inside the body of the tire engaging the inner crown thereof,
   d. tire drive means engaging the outer crown of the tire and operative to rotate the tire around the tire slitting head,
   e. external guide means mounted on the frame and positionable against the side wall of the tire to guide and stabilize the tire during rotation, and the external guide means comprising:
      1. an L-shaped plate mounted on the frame parallel to the plane of the tire and positioned to make three point contact with the side wall of the tire,
      2. sliding support means mounting the plate to allow lateral movement of the plate relative to the tire, and
      3. linkage means connected to the plate to initiate movement of the plate on the sliding support means, and
   f. cutting means mounted on the tire slitting head and positioned to slit the tire from the inside out.

2. The tire slitting apparatus of claim 1 wherein the L-shaped plate comprises
   a. a substantially horizontal leg longitudinally angled toward the tire at its terminal portion and laterally angled away from the tire at its lower edge,
   b. a substantially vertical leg, located adjacent the horizontal leg, inwardly offset toward the tire from the horizontal leg and laterally angled toward the tire at its outer edge, and
   c. adjustment means connected to each leg to adjust the lateral angles of the legs relative the plane of the tire.

3. A tire slitting apparatus for slitting tire carcasses circumferentially into segments, comprising:
   a. a frame,
   b. a tire head assembly mounted on the frame and receiving the tire,
   c. a tire slitting head mounted on the tire head assembly and fitting inside the body of the tire engaging the inner crown thereof,
   d. tire drive means engaging the outer crown of the tire and operative to rotate the tire around the tire slitting head, the tire drive means comprising:

1. drive rollers rotatably mounted in the frame and positioned to frictionally engage the outer crown surface of the tire,
2. elastic bands defining a plurality of peripheral holes and configured to fit releasably over the drive rollers for frictional engagement therewith,
3. tire studs located within the holes and having head portions positioned between the bands and the drive rollers and gripping portions protruding from the bands, and
4. power means for rotating the drive rollers, e. external guide means mounted on the frame and positionable against the side wall of the tire to guide and stabilize the tire during rotation, and f. cutting means mounted on the tire slitting head and positioned to slit the tire from the inside out.

4. The tire slitting apparatus of claim 3 wherein the cutting means comprises a. a flat knife having a pointed cutting portion with a sharpened edge and an alignment portion, b. at least one knife guide to support the alignment portion of the knife and guide it for lateral movement of the knife relative the tire slitting head, and c. translation means connected to the knife to translate it in the knife guides.

5. The tire slitting apparatus of claim 4 wherein the translation means comprises an hydraulic cylinder.

6. The tire slitting apparatus of claim 4 wherein the knife guides are located on the tire slitting head to allow movement of the knife between an extended cutting position in which the cutting portion of the knife extends past the idler rollers and a retracted position in which the cutting portion of the knife is positioned behind the idler rollers.

* * * * *